United States Patent
Qian et al.

(10) Patent No.: US 12,447,581 B2
(45) Date of Patent: Oct. 21, 2025

(54) CHEMICAL MECHANICAL PLANARIZATION PAD HAVING POLISHING LAYER WITH MULTI-LOBED EMBEDDED FEATURES

(71) Applicant: Rohm and Haas Electronic Materials CMP Holdings, Inc., Newark, DE (US)

(72) Inventors: Bainian Qian, Newark, DE (US); Donna M. Alden, Bear, DE (US); Sheng-Huan Tseng, Zhubei (TW)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 670 days.

(21) Appl. No.: 17/811,624

(22) Filed: Jul. 11, 2022

(65) Prior Publication Data

US 2024/0009798 A1    Jan. 11, 2024

(51) Int. Cl.
| | |
|---|---|
| *B32B 37/22* | (2006.01) |
| *B24B 37/22* | (2012.01) |
| *B24B 37/24* | (2012.01) |
| *B24D 3/00* | (2006.01) |
| *B32B 37/24* | (2006.01) |

(52) U.S. Cl.
CPC .............. *B24B 37/22* (2013.01); *B24B 37/24* (2013.01); *B24D 3/00* (2013.01)

(58) Field of Classification Search
CPC ......... B24B 37/22; B24B 37/24; B24B 37/26; B24D 18/0009; B24D 3/20; C08G 18/3814; C08G 18/3868; H01L 21/67092
See application file for complete search history.

(56) References Cited

U.S. PATENT DOCUMENTS

| | | | |
|---|---|---|---|
| 5,578,362 A | 11/1996 | Reinhardt et al. | |
| 6,998,166 B2 | 2/2006 | Prasad | |
| 8,357,027 B2 | 1/2013 | Saikin | |
| 9,238,294 B2 * | 1/2016 | Lefevre | B24B 37/26 |
| 9,314,898 B2 | 4/2016 | Kazuno | |
| 10,391,606 B2 | 8/2019 | Weis et al. | |
| 2006/0108701 A1* | 5/2006 | Saikin | B29B 7/90 |
| | | | 264/460 |
| 2021/0162560 A1 | 6/2021 | Ahn et al. | |

* cited by examiner

*Primary Examiner* — K. Boyle
(74) *Attorney, Agent, or Firm* — Blake T. Biederman (57) ABSTRACT

A polishing pad for chemical mechanical polishing comprises a polishing layer that comprises a polymer matrix that is the reaction product of an isocyanate terminated prepolymer with a curative, wherein the polymer matrix has hard segments and soft segments wherein multi-lobed polymeric elements formed from pre-expanded polymeric microspheres are present in the polymer matrix. The polishing pad can be made by preparing a pre-blend of the isocyanate terminated prepolymer and the pre-expanded fluid filled polymeric microspheres in a stirred tank; pumping a portion of the pre-blend from a bottom of the stirred tank through a conduit and recycling to a top region of the stirred tank, mixing a portion of the pre-blend with the curative to form a mixture, casting the mixture in a mold, curing the mixture in the mold.

9 Claims, 3 Drawing Sheets

CHEMICAL MECHANICAL PLANARIZATION PAD HAVING POLISHING LAYER WITH MULTI-LOBED EMBEDDED FEATURES

FIELD

This application relates to polishing pads useful for polishing and planarizing substrates, such as semiconductor substrates or magnetic disks.

BACKGROUND

Chemical Mechanical Planarization (CMP) is a polishing process that is used to flatten, or planarize, the layers of construction of an integrated circuit to precisely build multilayer three-dimensional circuitry. The layer to be polished is often a thin film (e.g., less than 10,000 Angstroms) that has been deposited on an underlying substrate. The objectives of CMP are to remove excess material on the wafer surface to produce an extremely flat layer of a uniform thickness, said uniformity extending across the entire wafer area. Control of removal rate and the uniformity of removal are of paramount importance.

CMP uses a polishing pad and a polishing fluid (e.g., slurry) to polish a substrate (e.g., a wafer). The fluid or slurry typically contains nano-sized particles. The polishing pad can be mounted on a rotating platen. The substrate (e.g., wafer) can be mounted into a separate fixture, or carrier, which can have a separate means of rotation. The polishing pad and substrate are pressed against each other under a controlled load with high rate of relative motion (i.e., high rate of shear). The slurry is provided between the polishing pad and the substrate. This shear and any slurry particles trapped at the pad/wafer junction abrade the substrate surface, leading to removal of material from the substrate.

The polishing pad can comprise multiple layers; (a) an upper layer that contacts the wafer to provide the polishing action (i.e., a polishing layer), (b) one or more sub-layers of greater compressibility incorporated to adjust pad-wafer compliance, and (c) optionally, adhesive layers used to join (a) and (b) as well as for affixing the entire pad to the rotating platen. The upper polishing layer is of critical importance to the success of the CMP process.

The polishing layer in many CMP pads comprise closed cell polyurethanes formed by reacting polyols with isocyanates to form an isocyanate terminated prepolymer, followed by mixing with a curative and polymeric microelements that leads to reaction to form the polishing layer. See, e.g., U.S. Pat. Nos. 5,578,362, and 10,391,606.

SUMMARY OF THE INVENTION

Disclosed herein is a polishing pad for chemical mechanical polishing comprising: a polishing layer that comprises a polymer matrix that is the reaction product of an isocyanate terminated prepolymer with a curative, wherein the polymer matrix has hard segments and soft segments wherein multi-lobed polymeric elements formed from pre-expanded polymeric microspheres are present in the polymer matrix.

Also disclosed herein is a method of making such polishing pads comprising the multi-lobed polymeric elements wherein the method comprises preparing a pre-blend of the isocyanate terminated prepolymer and the pre-expanded fluid filled polymeric microspheres in a stirred tank; pumping a portion of the pre-blend from a bottom of the stirred tank through a conduit and recycling to a top region of the stirred tank, mixing a portion of the pre-blend with the curative to form a mixture, casting the mixture in a mold, curing the mixture in the mold.

Further disclosed herein is a method comprising providing a substrate comprising a metal, a metal oxide, or both, and polishing the substrate using the polishing pad as disclosed herein.

DETAILED DESCRIPTION OF THE INVENTION

The present inventors discovered a polishing pad having good polishing performance. The pad comprises a polishing layer that comprises a polymer matrix that is the reaction product of an isocyanate terminated prepolymer with a curative, wherein the polymer matrix has hard segments and soft segments wherein multi-lobed polymeric elements formed from pre-expanded polymeric microspheres are present in the polymer matrix. The polishing pad shows improved polishing performance relative to similar pads that lack the multi-lobed polymeric elements.

The Matrix Polymer

The polymer matrix is preferably a polyurethane matrix. For purposes of this specification polyurethane includes polyurethanes, polyureas and polyurethane-urea copolymers. These polyurethane polymers are formed with a blend of hard segments and soft segments. Although it is possible for the hard segments and soft segments to remain amorphous, advantageously they organize into hard segment domains and soft segment domains.

The prepolymer includes at least two isocyanate groups for reaction with the curative. In other words, each prepolymer has at least two isocyanate end groups. The isocyanate groups can be terminal groups on the prepolymer. For example, if the prepolymer is a linear prepolymer without branching or isocyanate pendant groups there can be two terminal isocyanate end groups.

The prepolymer system can comprise one prepolymer or mixtures of two or more prepolymers. The wt % unreacted isocyanate group (NCO) range can be adjusted by the blends of the prepolymers and the prepolymer polyols thereof. The prepolymer system can, optionally, comprise lower molecular weight species—e.g., monomers, dimers, etc.

The prepolymer can be formed from a polyfunctional aromatic isocyanate (e.g., an aromatic polyisocyanate) and a prepolymer polyol.

For purposes of this specification, the term prepolymer polyol includes diols, polyols, polyol-diols, copolymers thereof and mixtures thereof. Examples of prepolymer polyols include polyether polyols, such as, poly(oxytetramethylene)glycol, poly(oxypropylene)glycol and mixtures thereof, polycarbonate polyols, polyester polyols, polycaprolactone polyols and mixtures thereof. The preceding polyols can be mixed with low molecular weight polyols, such as ethylene glycol, 1,2-propylene glycol, 1,3-propylene glycol, 1,2-butanediol, 1,3-butanediol, 2-methyl-1, 3-propanediol, 1,4-butanediol, neopentyl glycol, 1,5-pentanediol, 3-methyl-1,5-pentanediol, 1,6-hexanediol, diethylene glycol, dipropylene glycol, tripropylene glycol and mixtures thereof. The prepolymer polyol can be, for example, selected from the group comprising polytetramethylene ether glycol [PTMEG], polyethylene glycol [PEG], also known as polyethylene oxide [PEO], polypropylene ether glycol [PPG], also known as polypropylene oxide [PPO], ester-based polyols, such as ethylene or butylene adipates, copolymers thereof and mixtures thereof. Preferably the prepolymer polyol is selected from the group comprising polytetramethylene ether glycol, polyester polyols, polypropylene ether glycols, polycaprolactone polyols, copolymers thereof and mixtures thereof.

Examples of polyfunctional aromatic isocyanates include 2,4-toluene diisocyanate, 2,6-toluene diisocyanate, 4,4'-diphenylmethane diisocyanate, dicyclohexylmethane 4,4'-diisocyanate, naphthalene-1,5-diisocyanate, tolidine diisocyanate, para-phenylene diisocyanate, xylylene diisocyanate, mixtures thereof and isomers thereof. The polyfunctional aromatic isocyanate can have less than 20 wt % aliphatic isocyanates, such as dicyclohexylmethane 4,4'-diisocyanate, isophorone diisocyanate and cyclohexane diisocyanate. The polyfunctional aromatic isocyanate can have less than 15, or less than 12, wt % aliphatic isocyanates.

If the prepolymer polyol includes PTMEG, a copolymer thereof, or a mixture thereof (e.g., mixture of PTMEG with PPG or PEG), then the isocyanate-terminated reaction product can have a wt % unreacted NCO range of 2.0 to 30.0, or 6.0 to 10.0, wt % based on total weight of the prepolymer polyol. Particular examples of PTMEG family polyols are as follows: POLYMEG® 2900, 2000, 1000, 650 from LyondellBasell; PTMEG polyols 220, 650, 1000, 1400, 1800, 2000, and 3000 available from Gantrade; PolyTHF® 650, 1000, 2000 from BASF, and lower molecular weight species such as 1,2-butanediol, 1,3-butanediol, and 1,4-butanediol. If the prepolymer polyol is a PPG/PO, copolymer thereof or a mixture thereof, then the isocyanate-terminated reaction product can have a wt % unreacted NCO range of 4.0 to 30.0, or 6.0 to 10.0, wt %. Particular examples of PPG polyols are as follows: Arcol® PPG-425, 725, 1000, 1025, 2000, 2025, 3025 and 4000 from Covestro; Voranol® 1010L, 2000L, and P400 from Dow; Desmophen® 1110BD, Acclaim® Polyol 12200, 8200, 6300, 4200, 2200 both product lines from Covestro. If the prepolymer polyol is an ester, copolymer thereof or a mixture thereof, then the isocyanate-terminated reaction product can have a wt % unreacted NCO range of 6.5 to 13.0. Particular examples of ester polyols are as follows: Millester 1, 11, 2, 23, 132, 231, 272, 4, 510, 51, 7, 8, 9, 10, 16, 253, from Polyurethane Specialties Company, Inc.; Desmophen® 1700, 1800, 2000, 2001KS, 2001K2, 2500, 2501, 2505, 2601, PE65B from Covestro; Rucoflex S-1021-70, S-1043-46, S-1043-55 from Covestro.

Preferably, the prepolymer reaction product has a 2.0 to 30.0 wt %, 4 to 13 wt %, 5 to 11 wt % or 6 to 10 wt % unreacted NCO. Examples of suitable prepolymers within this unreacted NCO range include: Imuthane® prepolymers PST-80A, PST-85A, PST-90A, PST-PET-85A, PET-90A, PET-91A, PET-93A, PET-95A, PET-60D, PET-70D, PET-75D, PHP-80A, PHP-85A, PHP-60D, PHP-75D, PHP-80D, PPT-80A, PPT-90A, PPT-95A, PPT-65D, PPT-75D, PCM-95A, PCM-75D, APC-504, APC-722, and API-470 manufactured by COIM USA, Inc. and Adiprene® prepolymers, LFG740D, LF700D, LF750D, LF751D, LF753D, L325, LF600D, LFG963A, and LF950A manufactured by Lanxess. In addition, blends of other prepolymers besides those listed above could be used to reach to appropriate percent unreacted NCO levels as a result of blending. Many of the above-listed prepolymers, such as, LFG740D, LF700D, LF750D, LF751 D, LF753D, LF600D, LFG963A, LF950A, PST-80A, PST-85A, PST-PST-95A, PET-85A, PET-90A, PET-91A, PET-93A, PET-95A, PET-60D, PET-70D, PET-PHP-80A, PHP-85A, PHP-60D, PHP-75D, PHP-80D, PPT-80A, PPT-90A, PPT-95A, PPT-65D, PPT-75D, PCM-95A, and PCM-75D, are low-free isocyanate prepolymers that have less than 0.1 wt % free toluene diisocyanate (TDI) monomer and have a more consistent prepolymer molecular weight distribution than conventional prepolymers, and so facilitate forming polishing pads with excellent polishing characteristics. This improved prepolymer molecular weight consistency and low free isocyanate monomer give a more regular polymer structure, and contribute to improved polishing pad consistency. For most prepolymers, the low free isocyanate monomer is preferably below 0.5 wt %. Furthermore, "conventional" prepolymers that typically have higher levels of reaction (i.e., more than one polyol capped by a diisocyanate on each end) and higher levels of free toluene diisocyanate prepolymer should produce similar results. In addition, low molecular weight polyol additives, such as, diethylene glycol, butanediol and tripropylene glycol facilitate control of the prepolymer reaction product's wt % unreacted NCO.

As an example, the prepolymer can be a reaction product of 4, 4'-diphenylmethane diisocyanate (MDI) and polytetramethylene glycol with a diol. Most preferably, the diol is 1, 4-butanediol (BDO). Preferably, the prepolymer reaction product has 6 to 10 wt. % unreacted NCO. Examples of suitable polymers with this unreacted NCO range include the following: Imuthane 27-85A, 27-90A, 27-95A, 27-52D, 27-58D from COIM USA and Andur® IE-75AP, IE80AP, IE90AP, IE98AP, IE110AP prepolymers from Anderson Development Company.

The curative can comprise any polyfunctional (e.g., difunctional) curative suitable for reacting with the isocyanate terminated prepolymer (or oligomer). For example, polyfunctional amine (e.g., diamine) curatives can be used. Examples of polyamine curatives include alkylthiotoluene diamines (such as dimethylthiotoluenediamine [DMTDA], diethylthiotoluenediamine [DETDA]; monomethylthiotoluenediamine, monoethylthiotoluenediamine, or combinations of two or more thereof), alkylchlorotoluene diamines (such as dimethylchlorotoluenediamine, diethylchlorotoluenediamine, 4-chloro-3,5-diethyltoluene-2,6-diamine), trimethyleneglycol di-p-aminobenzoate; polytetramethyleneoxide di-p-aminobenzoate: polytetramethyleneoxide mono-p-aminobenzoate; polypropyleneoxide di-p-aminobenzoate; polypropyleneoxide mono-p-aminobenzoate, Isobutyl 4-chloro-3,5-diaminobenzoate; 5-tert-butyl-2,4- and 3-tert-butyl-2,6-toluenediamine; 5-tert-amyl-2,4- and 3-tert-amyl-2,6-toluenediamine and chlorotoluenediamine; 4,4'-methylene-bis-o-chloroaniline [MbOCA], 4,4'-methylene-bis-(3-chloro-2,6-diethylaniline) [MCDEA]; 1,2-bis(2-aminophenylthio)ethane; 4,4'-methylene-bis-aniline; methylene-bis-methylanthranilate [MBNA].

Other polyfunctional curative such as, a diol, triol, tetraol, or hydroxy-terminated isocyanate may also be used, with or without the polyfunctional amine curative. Suitable diol, triol, and tetraol groups include ethylene glycol, diethylene glycol, polyethylene glycol, propylene glycol, polypropylene glycol, lower molecular weight polytetramethylene ether glycol, 1,3-bis(2-hydroxyethoxy) benzene, 1,3-bis-[2-(2-hydroxyethoxy)ethoxy]benzene, 1,3-bis-{2-[2-(2-hydroxyethoxy)ethoxy]ethoxy}benzene, 1,4-butanediol, 1,5-pentanediol, 1,6-hexanediol, resorcinol-di-(beta-hydroxyethyl) ether, hydroquinone-di-(beta-hydroxyethyl) ether, and mixtures thereof. Preferred hydroxy-terminated isocyanates include 1,3-bis(2-hydroxyethoxy) benzene, 1,3-bis-[2-(2-hydroxyethoxy)ethoxy]benzene, 1,3-bis-{2-[2-(2-hydroxyethoxy)ethoxy]ethoxy}benzene, 1,4-butanediol, and mixtures thereof.

The ratio of prepolymer to curative can be determined according to stoichiometry. As used herein "stoichiometry" (Stoich) of a reaction mixture refers to the molar equivalents of (free OH+free $NH_2$ groups) in the curative relative to free NCO groups in the prepolymer (e.g., 100×(mole of amine and hydroxyl groups in curative blend/mole of NCO groups in prepolymer). The stoichiometry can be, for example, in the range of 80% to 120%, preferably 87% to 105%.

After polymerization reaction of the curatives and the isocyanate functional prepolymers, the resulting polymer comprises a hard phase and a soft phase (or hard segment and soft segment). The hard phase can be orderly or randomly arranged and packed to form hard segment domains.

Polymeric Microspheres

The pre-expanded polymeric microspheres are filled with a fluid. The fluid can be a liquid. The fluid can be a gas or a combination of gas and liquid. If the fluid comprises a liquid, then the preferred fluid is water, such as distilled water that only contains incidental impurities. For purposes of this application the term microsphere includes shells with less than a perfect spherical shape; for example, these shells have what appears to be a semi-hemispherical shape when cut open and viewed with an SEM. If the fluid comprises a gas, then air, nitrogen, argon, carbon dioxide or combination thereof is preferred. For some microspheres, the gas may be an organic gas, such as isobutane. Preferably, the fluid is isobutane, isopentane or a combination of isobutane and isopentane. Isobutane trapped in the polymeric microsphere is gas at room temperature (25° C.) and above, depending upon internal pressure in the polymeric shell. Isopentane trapped in the polymeric microsphere is a combination of liquid and gas at room temperature. At temperatures of about 30° C. and above, the isopentane becomes gas—depending upon internal pressure in the polymeric shell.

A polymeric shell holds the fluid; and typically the polymeric shell holds gas under pressure. The polymeric shell can be chlorine free or substantially chlorine free. By substantially chlorine free, is meant that the shell comprises less than 0.1, less than 0.05, or less than 0.01 wt % chlorine based on total weight of the polymeric shell. Specific examples of the polymer shell include polyacrylonitrile/methacrylonitrile shells. Furthermore, these shells may incorporate inorganic particles, such as silicates, calcium-containing or magnesium-containing particles. These particles facilitate separation of the polymeric microspheres. The pre-expanded polymeric microspheres have been expanded before combination with the pre-polymer to a volume average diameter range or distribution. For purposes of this volume average diameter can be calculated from the following equation:

$$\frac{\sum_{1}^{n} D_i^4 v_i}{\sum_{1}^{n} D_i^3 v_i},$$

where $D_i$ is the diameter of the particle of a given size and $v_i$ is the number of occurrences of the particle of that size. Typical volume average diameters are in the range of 5 to 200, 10 to 100, 15 to 50, or 17 to 45 microns. For example, the volume average diameter may be around 20 microns or 40 microns.

The pre-expanded polymeric microspheres can be added to the mixture in an amount of from 0.5, from 0.75, from 1, from 1.25, from 1.5. from 1.75, or from 2 wt % based on weight of prepolymer, curative and pre-expanded polymeric microspheres. The amount of pre-expanded polymeric microspheres also at the same time can be up to 7, up to 5, up to 4.5, up to 4, up to 3.5, or 3.0 wt % based on weight of prepolymer, curative and pre-expanded polymeric microspheres. For convenience, the pre-expanded polymeric microspheres can be pre-blended with the prepolymer before addition of the curative.

The pre-expanded polymeric microspheres can be free of or substantially free of inorganic particles in or on the polymeric shell.

The polishing layer disclosed herein can have a specific gravity of less than or equal to 1, less than or equal to 0.9, less than or equal to 0.8, or less than or equal to 0.7 $gm/cm^3$. The specific gravity generally can be at least 0.5 g/cm 3. Specific gravity as used herein is the weight per volume of a sample and can be determined, for example, as set out in ASTM D1622-08 (2008). Such polishing layers can simultaneously have a unimodal or a multimodal (e.g., bimodal, trimodal, etc.) pore size distribution.

The volume average size of the pores in the cured polishing layer can range from about 5 microns to about 200, or 10 to about 100 microns.

Multi-Lobed Polymeric Elements

Figure 4:
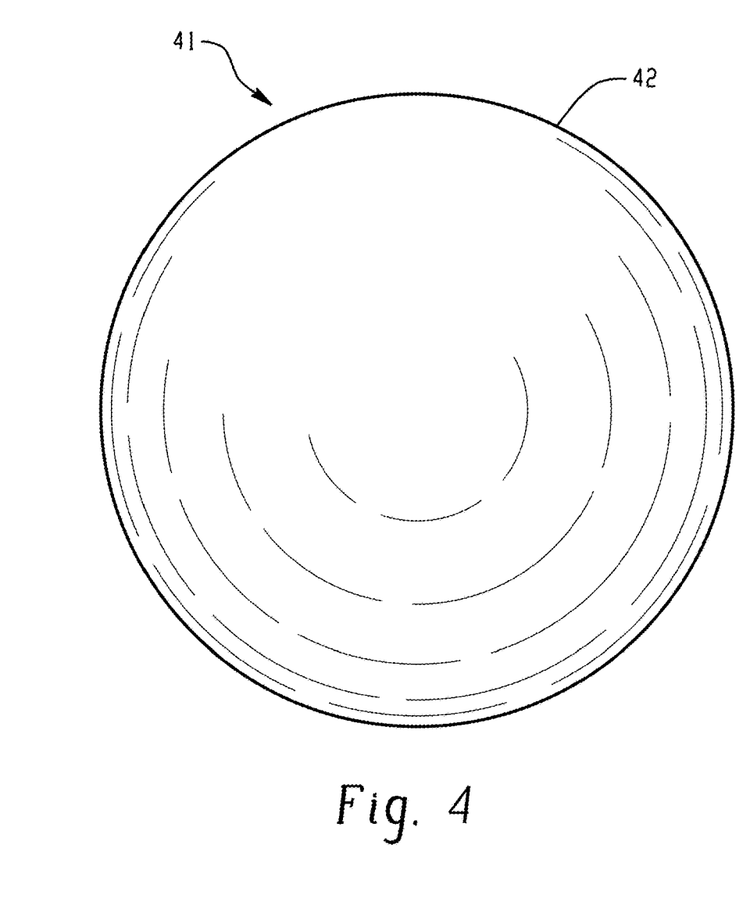
FIG. 4 is a drawing of an example of a polymeric microsphere as used in forming the polishing layer.
Figure 5:
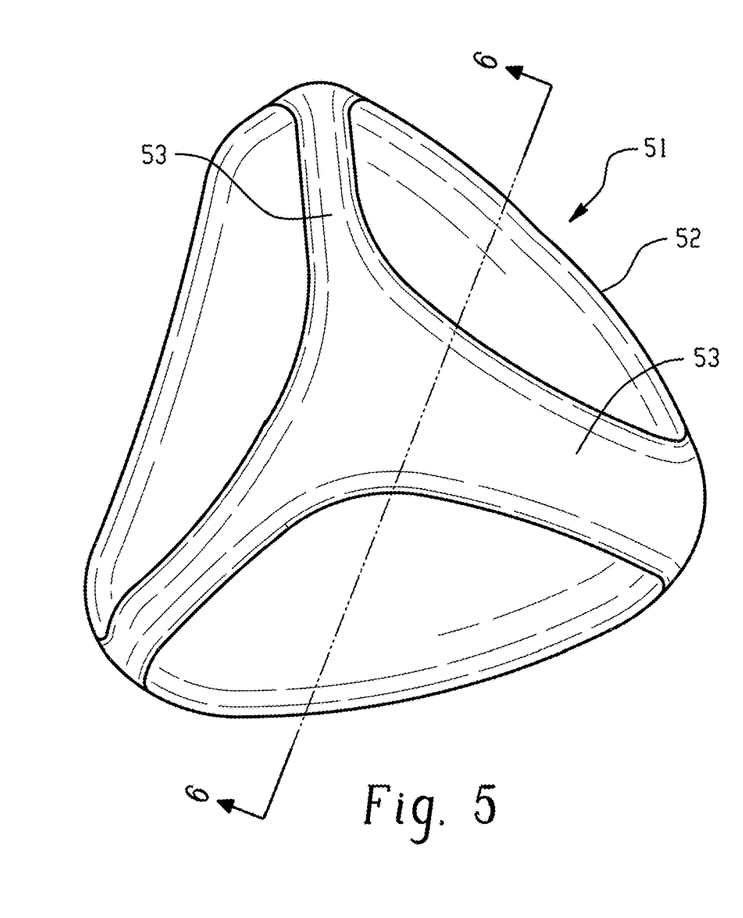
FIG. 5 is a drawing of an example of a deflated polymeric microsphere to a multi-lobed form.
Figure 6:
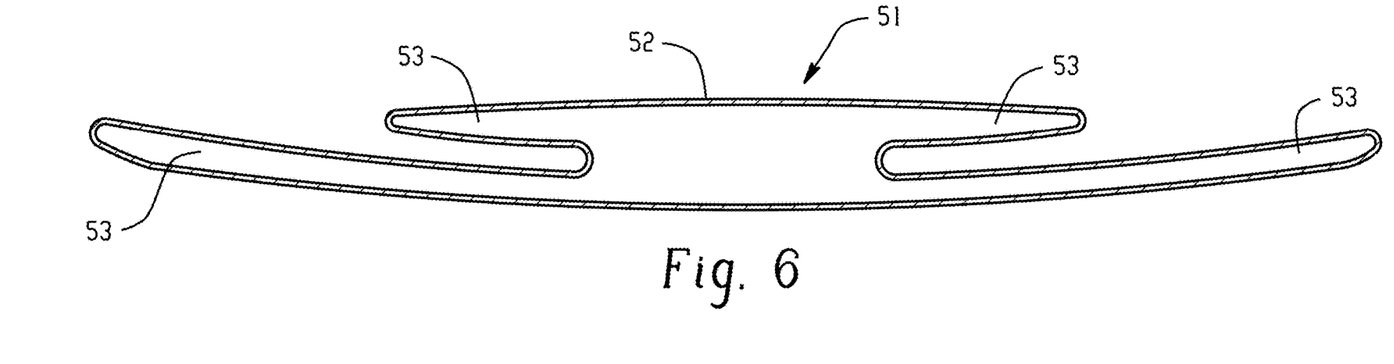
FIG. 6 is a cross-section of the deflated polymeric microsphere of FIG. 5.
Figure 7:
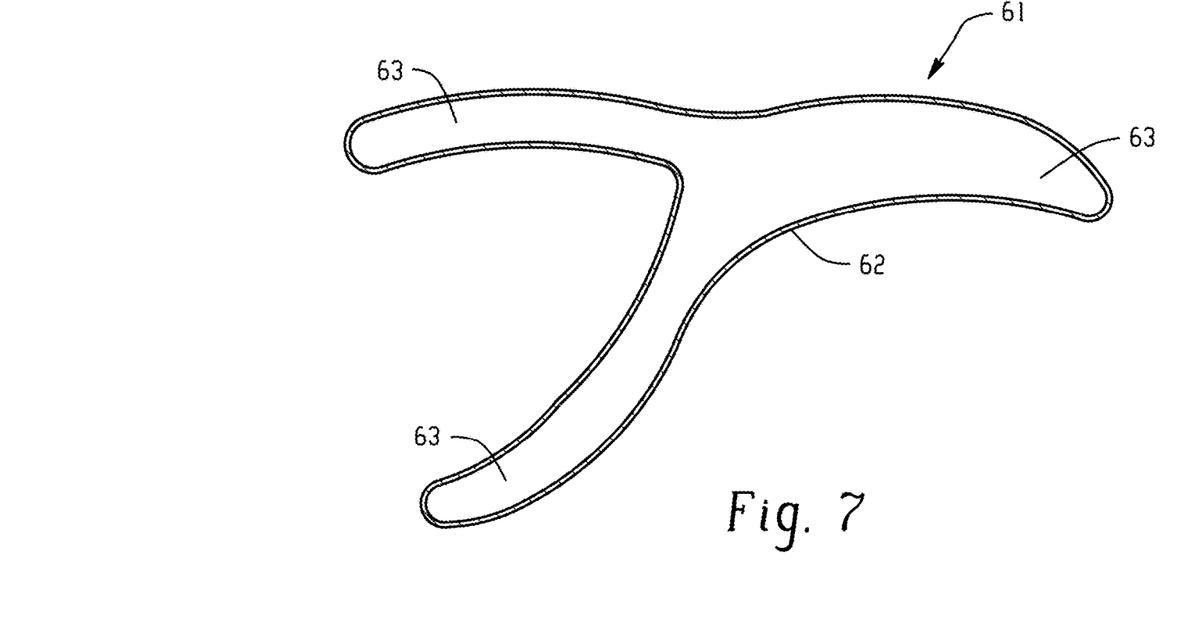
FIG. 7 is a cross-section of an example of a deflated polymeric microsphere showing curved shaped lobes.

The polishing pads disclosed herein include a polishing layer having multi-lobed polymeric elements. The multi-lobed polymeric elements can be a residual of a deflated or partially deflated pre-expanded polymeric microsphere. As used herein deflated means that at least a portion of the fluid that was in the polymeric microsphere has escaped or been removed. This can cause a visual change in the morphology. FIG. 4 shows an example of a substantially spherical pre-expanded fluid filled polymeric microsphere 41 having a shell 42. FIG. 5 shows an example of a deflated polymeric microsphere 51 having a shell 52 with lobes 53. FIG. 6 shows a cross-section of the deflated polymeric microsphere 51 with shell 52 and lobes 53. In the cross-section, it can be seen that the lobes may be in the form of substantially plate-like protrusions. By plate-like is meant the structure has a relatively low thickness as compared to length and width. Plate-like can be substantially planar. However, FIG. 7 shows a cross-section of a second example of a deflated polymeric microsphere 61 having a shell 62 and lobes 63 where the lobes are curved. The lobes may be plate-like (low thickness relative to length and width) but in this instance the plate-like structures are curved.

Without wishing to be bound by theory, the formation of the multi-lobed polymeric elements may arise from the use of pre-expanded polymeric microspheres that have polymeric shells that are substantially chlorine free when processed as described below.

The multi-lobed polymeric elements are dispersed in the polymer matrix. In addition, pre-expanded polymeric microspheres that have not deflated or collapsed can be dispersed in the polymer matrix, thereby forming pores in a porous polishing layer. The pores formed by the pre-expanded polymeric microspheres that have not deflated or collapsed will generally be spherical. Although occasionally they may be slightly deformed forming ellipsoid or substantially spherical pores. Also occasionally they may be somewhat irregular but without showing substantial evidence of deflation.

The occurrence of multi-lobed polymeric elements in the polymer matrix can be measured as a percentage of the overall initial loading of pre-expanded polymeric microspheres in the pre-blend. Typically, a majority of the pre-expanded microspheres do not deflate a sufficient amount to form lobes. For instance, 0.1 to 20, or 0.5 to 15 or 1 to 10% of the pre-expanded polymeric microspheres may deflate to form multi-lobed polymeric elements.

The multi-lobed polymeric elements comprise three or more lobes, or four or more lobes. Generally, they will have fewer than 10 or fewer than 7 or no more than 5 lobes. The multi-lobed polymeric elements can include a residual void space. For example, a portion of the deflated residues of the pre-expanded polymeric microspheres can comprise a residual irregularly shaped void space. A portion of the lobes of the multi-lobed polymeric elements comprise plate-like protrusions that project from a central region. The platelike protrusions need not be completely flat or planar. The plate-like protrusions can include two edges of what had been the shell of the pre-expanded polymeric microsphere that contact each other after deflation.

The multi-lobed polymeric elements, e.g., the deflated residues of the pre-expanded polymeric microspheres, can be free of evidence of holes or tears when examined under scanning electron microscope at 50× magnification. It is believed without wishing to be bound that in this instance the fluid in the pre-expanded polymeric microspheres diffused out rather than bursting the shell or leaking out through a relatively large hole in the shell.

The multi-lobed polymeric elements, e.g., the deflated residues of the pre-expanded polymeric microspheres, can have a maximum dimension (e.g., from tip of one lobe to furthest tip of another lobe) of about 20 to about 200 microns.

The multi-lobed polymeric elements can be inter-dispersed with the un-deflated or substantially spherical polymeric microspheres. For instance, in some occurrences within the polishing layer an un-deflated or substantially spherical polymeric microsphere may be located partially between lobes or plates of an adjacent multi-lobed polymeric element. See e.g., FIG. 1. The distance between multi-lobed polymeric elements or between a multi-lobed polymeric element and a pre-expanded polymeric microsphere (that is not deflated or that remains substantially spherical) can be less than three times the volume average diameter of the pre-expanded polymeric microspheres, less than two times the volume average diameter of the pre-expanded polymeric microspheres, or less than the volume average diameter of the pre-expanded polymeric microspheres. The distance between multi-lobed polymeric elements or between a multi-lobed polymeric element and a pre-expanded polymeric microsphere can be less than 400, less than 300, less than 200, less than 100, less than 60, less than 50, less than 40, or less than 30 microns.

Method of Manufacture, Other Features of Polishing Pad, and Use

The method of making the polishing layer can include preparing a pre-blend of the prepolymer (or oligomer) with polymeric microspheres (e.g., fluid filled, pre-expanded polymeric microspheres). The prepolymer (or oligomer) can be combined in a vessel with the polymeric microspheres. The vessel can be equipped with a stirrer or other agitator. The vessel can be equipped with an outlet for taking a stream from near the bottom of the vessel and a pump to return the stream to the top of the vessel for recirculation. The pre-blend can be heated to ensure adequate flow. For example, the pre-blend can be maintained in the tank at a temperature in the range of 40 to 80° C. or 45 to 70° C. or 50 to 60° C. The pre-blend is then provided to a separate mixer to be mixed with the curative by control mixing (e.g., in a pin mixer). The curative can also be heated to above its melt temperature as needed before delivery to the mixer. From the mix head, the mixed combination of pre-blend and curative is delivered to a mold to make an individual polishing layer or to make a polymer block that can be cut to form individual polishing layers. After filling the mold, the combination can be cured at an appropriate cure temperature—e.g., about 100 to 120° C.

In addition to the polishing layer, a polishing pad as disclosed herein can include one or more layers of sub-pad or base pad. An adhesive layer can be used to attach the polishing layer to the sub-pad or base pad.

The polishing layer can be textured with macrotexture in the form of grooves, pits, elevated elements, or the like.

The polishing pad as disclosed herein can be used, preferably with a polishing slurry, to polish a substrate comprising metals, dielectric materials (e.g., metal oxides), or both.

Examples

Manufacture and Characterization of Polishing Layer

A pre-blend of prepolymer and pre-expanded polymeric microspheres is prepared in a stirred tank with a recirculation loop from the bottom of the tank pumping a recirculating stream to a location near the top of the tank where it is held with recycle and stirring for 1 to 3 hours. The blend is heated to 52° C. to ensure adequate flow of the pre-blend. The pre-blend is degassed under vacuum with filtering in the recirculation loop. When ready to form the polishing layer the pre-blend and curative are mixed by control mixing. The curative is an aromatic diamine, which is preheated to above its melting temperature. When the cure agent is 4,4'-methylenebis(2-chloroaniline) (MbOCA) it can be pre-heated to 116° C. When the cure agent is dimethyl thio-toluene diamine (DMTDA) it can be pre-heated to 46° C. After exiting the mix head, the combination is dispensed over a period of 3 minutes into an 86.4 cm (34 inch) diameter circular mold to give a total pour thickness of approximately 8 cm (3 inches). The dispensed combination is allowed to gel for 15 minutes before placing the mold in a curing oven. The mold is then cured in the curing oven using the following cycle: 30 minutes ramp of the oven set point temperature from ambient temperature to 104° C., and then hold for 15.5 hours with an oven set point temperature of 104° C.

The loading of the polymer microspheres is controlled to target similar polishing layer density of 0.8 g/cm$^3$, or at 32 percent by volume based on total volume of the polishing layer portion. The components for the polishing layer are as set forth in Table 1.

TABLE 1

|  | Prepolymer NCO, wt % | Cure Agent | Chlorine Free | Volume Average Pore Size, Micrometers | Specific Gravity (SG) |
|---|---|---|---|---|---|
| Ex. 1 | 8.95 to 9.25 | DMTDA | Yes | 15 to 27 | 0.064 to 0.096 |
| Ex. 2 | 7.06 to 7.46 | MbOCA | Yes | 15 to 27 | 0.064 to 0.096 |
| Comp. Ex. 1 | 8.95 to 9.25 | DMTDA | No | 15 to 27 | 0.064 to 0.096 |
| Comp. Ex. 2 | 7.06 to 7.46 | MbOCA | No | 15 to 27 | 0.064 to 0.096 |

Figure 1:
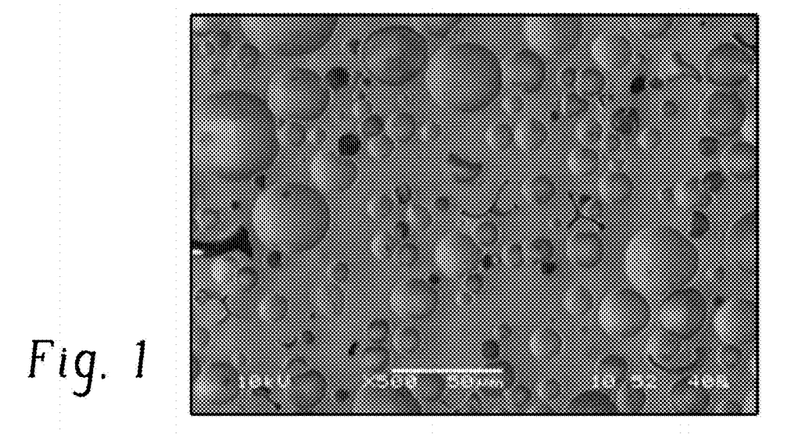
FIG. 1 is a scanning electron microscopy (SEM) photograph of an exemplary polishing layer as disclosed here.
Figure 2:
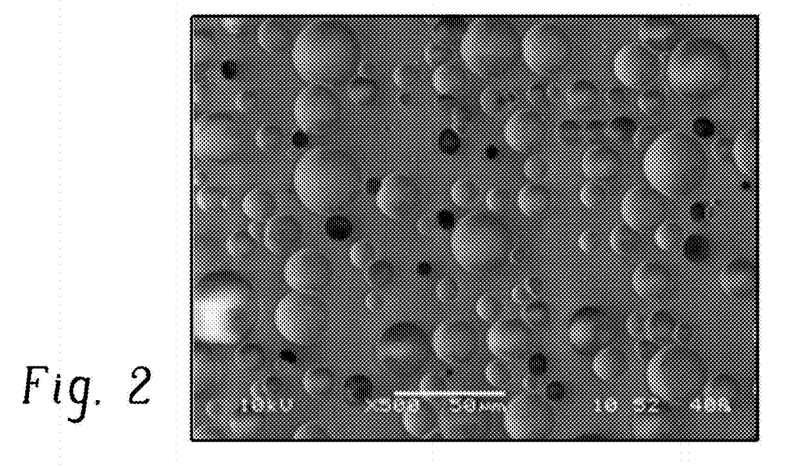
FIG. 2 is a scanning electron microscopy (SEM) photograph of a comparative polishing layer.
Figure 3:
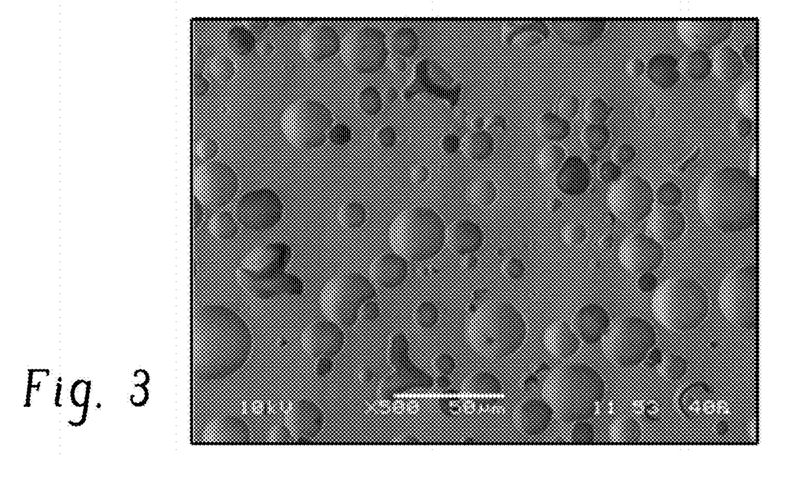
FIG. 3 is a scanning electron microscopy (SEM) photograph of an exemplary polishing layer as disclosed here.

Scanning electron micrographs of Examples 1 and 2 are shown in FIGS. 1 and 3, respectively, where lobed structure indicative of collapsed or deflated residue of pre-expanded polymeric microspheres are seen. In contrast, Comparative Example 1 that used the same prepolymer and curative but used a pre-expanded polymeric microsphere that included chlorine in the shell at an amount of about 30% by weight based on total weight of the shell did not show any multi-lobed structures. See FIG. 2. Likewise, an SEM of Comparative Example 2 did not show any multi-lobed structures.

Manufacture and Testing of Pads

Polishing layers made as described above and about 2 mm thick were machined to provide grooves. Each polishing layer was attached to a sub-pad using a reactive hot melt adhesive for polishing evaluations.

For a first test, the pads with polishing layer of Example 1 and Comparative Example 1 were tested using a low pH oxide slurry containing 2% by weight colloidal silica abrasive. After conditioning the pad, the polishing was done at a down force of 3.5 psi (0.024 MPa) at 80 rotations per minute for the platen and 81 rotations per minute for the head and a polishing time of 60 seconds. The slurry flow rate was 300 ml/min. Nine dummy and three TEOS (tetraethyl ortho silicate) derived silicon oxide monitor wafers were run. Results from pads according to Examples 1 and Comparative Example 1 are shown in Table 2. The Pad from Example 1 demonstrated surprisingly not only higher TEOS derived oxide removal rate, but also less scratches and chatter-marks than Comparative Example 1 of the same configuration.

TABLE 2

| Pad | Wafer # | TEOS Removal Rate (Å/min) | Extrapolation Scratch & Chatter-Marks |
|---|---|---|---|
| Comp. Ex. 1 | $1^{st}$ | 3650 | 14 |
| Comp. Ex. 1 | $2^{nd}$ | 3648 | 14 |
| Comp. Ex. 1 | $3^{rd}$ | 3597 | 19 |
| Ex. 1 | $1^{st}$ | 3916 | 10 |
| Ex. 1 | $2^{nd}$ | 3843 | 7 |
| Ex. 1 | $3^{rd}$ | 3846 | 3 |

Note:
An extrapolation scratch and chatter-marks means the total amount of scratch & chatter-marks extrapolated based on reviewing 100 randomly selected defects.

For a second test, the pads with polishing layer of Example 1 and Comparative Example 1 were tested using a low pH tungsten slurry containing 2% by weight colloidal silica abrasive and additional 2.5% by weight of hydrogen peroxide. After conditioning the pad, the polishing was done at a down force of 4.7 psi (0.033 MPa) at 80 rotations per minute for the platen and 81 rotations per minute for the head and a polishing time of 60 seconds. The slurry flow rate is 100 ml/min. Tungsten wafers, TEOS derived silicon oxide wafers, and silicon nitride (SiN) wafers were run to determine removal rate for each individual wafer type. Defectivity in scratches and chatter-marks were determined from TEOS derived oxide wafers. Results from pads according to Examples 1 and Comparative Example 1 are shown in Tables 3 and 4. The Pad from Example 1 demonstrated surprisingly not only higher tungsten removal rate, but also less scratches and chatter-marks on TEOS derived oxide wafers than Comparative Example 1 of the same configuration.

TABLE 3

| Pad | Tungsten (W) Removal rate (Å/min) | SiN (Å/min) | W/SiN selectivity | Average TEOS Removal rate (Å/min) | W/TEOS Selectivity |
|---|---|---|---|---|---|
| Comp. Ex. 1 | 3083 | 474 | 6.5 | 690 | 4.5 |
| Ex. 1 | 3384 | 523 | 6.5 | 713 | 4.7 |

TABLE 4

| Pad | Wafer # | TEOS Removal Rate (Å/min) | Extrapolation Scratch & Chatter-Marks |
|---|---|---|---|
| Comp. Ex. 1 | $1^{st}$ | 681 | 220 |
| Comp. Ex. 1 | $2^{nd}$ | 694 | 208 |
| Comp. Ex. 1 | $3^{rd}$ | 696 | 166 |
| Ex. 1 | $1^{st}$ | 710 | 124 |
| Ex. 1 | $2^{nd}$ | 715 | 119 |
| Ex. 1 | $3^{rd}$ | 713 | 75 |

For a third test, the pads with polishing layer of Example 2 and Comparative Example 2 are tested using a high pH oxide slurry containing 16% by weight colloidal silica abrasive. After conditioning the pad, the polishing is done at a down force of 5 psi (0.034 MPa) at 93 rotations per minute for the platen and 87 rotations per minute for the head and a polishing time of 60 seconds. The slurry flow rate is 250 ml/min. Nine dummy and three TEOS derived silicon oxide monitor wafers were run. Results from pads according to Examples 2 and Comparative Example 2 are shown in Table 5. The Pad from Example 2 has demonstrated similar TEOS derived oxide removal rate but less scratches and chatter-marks on TEOS derived oxide wafers than Comparative Example 2 of the same configuration.

TABLE 5

| Pad | Wafer # | TEOS Removal Rate (Å/min) | Extrapolation Scratch & Chatter-Marks |
|---|---|---|---|
| Comp. Ex. 2 | $1^{st}$ | 3963 | 130 |
| Comp. Ex. 2 | $2^{nd}$ | 4061 | 159 |
| Comp. Ex. 2 | $3^{rd}$ | 4070 | 135 |
| Ex. 2 | $1^{st}$ | 4087 | 67 |
| Ex. 2 | $2^{nd}$ | 4104 | 73 |
| Ex. 2 | $3^{rd}$ | 4132 | 96 |

This disclosure further encompasses the following aspects.

Aspect 1: A polishing pad for chemical mechanical polishing comprising a polishing layer that comprises a polymer matrix that is the reaction product of an isocyanate terminated prepolymer with a curative, wherein the polymer matrix has hard segments and soft segments wherein multi-lobed polymeric elements formed from pre-expanded polymeric microspheres are present in the polymer matrix.

Aspect 2: The polishing pad of Aspect 1 wherein the multi-lobed polymeric elements are deflated residues of the pre-expanded polymeric microspheres and wherein polishing layer further comprises pores formed by a portion of the pre-expanded polymeric microspheres that retain a shape that is substantially spherical or ellipsoid.

Aspect 3: The polishing pad of Aspect 1 or 2 wherein the multi-lobed polymeric elements comprise three or more lobes.

Aspect 4: The polishing pad of any of the previous Aspects wherein at least a portion of the deflated residues of the pre-expanded polymeric microspheres comprise a residual irregular void space.

Aspect 5: The polishing pad of any of the previous Aspects wherein at least a portion of the lobes of the multi-lobed polymeric elements comprise plate-like protrusions that project from a central region.

Aspect 6: The polishing pad of any of the previous Aspects wherein 0.1 to 20 percent of the pre-expanded polymeric microspheres form the multi-lobed polymeric elements.

Aspect 7: The polishing pad of any of the previous Aspects wherein the pre-expanded polymeric microspheres comprise a polymeric shell having a chlorine content less than 0.1 wt % based on total weight of the polymeric shell around a fluid filled core, where the fluid comprises a gas.

Aspect 8: The polishing pad of any of the previous Aspects wherein the deflated residues of the pre-expanded polymeric microspheres do not include holes or tears when examined under scanning electron microscope at 50× magnification.

Aspect 9: The polishing pad of any of the previous Aspects wherein the pre-expanded polymeric microspheres have a volume average diameter of 5 to 2000, preferably 10 to 100, more preferably 15 to 50, most preferably 17 to 45 microns.

Aspect 10: The polishing pad of any of the previous Aspects wherein the multi-lobed polymeric elements have a maximum dimension of less than 300, preferably less than 200, and more preferably less than 100 microns.

Aspect 11: The polishing pad of any of the previous Aspects wherein a distance between multi-lobed polymeric elements or between a multi-lobed polymeric element and a pre-expanded polymeric microsphere is less than 400, preferably less than 300, more preferably less than 200, yet more preferably less than 100, still more preferably less than 70, even more preferably less than 50, and most preferably less than 30 microns.

Aspect 12: A method of making the polishing pad of any of the previous Aspects comprising preparing a pre-blend of the isocyanate terminated prepolymer and the pre-expanded fluid filled polymeric microspheres in a stirred tank; pumping a portion of the pre-blend from a bottom of the stirred tank through a conduit and recycling to a top region of the stirred tank, mixing a portion of the pre-blend with the curative to form a mixture, casting the mixture in a mold, curing the mixture in the mold.

Aspect 13: The method of Aspect 12 wherein 0.1 to 20, preferably 0.5 to 15, or more preferably 1 to 10% of the pre-expanded polymeric microspheres deflate to form multi-lobed polymeric elements.

Aspect 14: The method of Aspect 12 or 13 wherein the pre-expanded polymeric microspheres comprise a polymeric shell having a chlorine content less than 0.1 wt % based on total weight of the polymeric shell around a fluid filled core, where the fluid comprises a gas.

Aspect 15: The method of any one of Aspects 12-14 wherein the pre-blend comprises 0.5-7, preferably 0.75-5, more preferably 1-4.5, yet more preferably 1.25-4, still more preferably 1.5 to 3.5 and most preferably 1.75 to 3 wt % of pre-expanded polymeric microspheres based on total weight of the pre-blend and the curative.

Aspect 16: The method of any one of Aspects 12-15 wherein the pre-expanded polymeric microspheres have a volume average diameter of 10 to 100, preferably 15 to 50, or more preferably 17 to 45 microns.

Aspect 17: A method of polishing comprising providing a substrate comprising metals, metal oxides, or both, and polishing the substrate using the polishing pad of Aspects 1-11.

Aspect 18: The method of Aspect 17 further comprising providing a polishing slurry between the pad and the substrate.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). Moreover, stated upper and lower limits can be combined to form ranges (e.g., "at least 1 or at least 2 wt %" and "up to 10 or 5 wt %" can be combined as the ranges "1 to 10 wt %", or "1 to 5 wt %" or "2 to 10 wt %" or "2 to 5 wt %").

The disclosure may alternately comprise, consist of, or consist essentially of, any appropriate components herein disclosed. The disclosure may additionally, or alternatively, be formulated so as to be devoid, or substantially free, of any components, materials, ingredients, adjuvants or species used in the prior art compositions or that are otherwise not necessary to the achievement of the function or objectives of the present disclosure.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

Unless specified to the contrary herein, all test standards are the most recent standard in effect as of the filing date of this application, or, if priority is claimed, the filing date of the earliest priority application in which the test standard appears.

What is claimed is:

1. A polishing pad for chemical mechanical polishing comprising:
a polishing layer that comprises a polymer matrix that is the reaction product of an isocyanate terminated prepolymer with a curative, wherein the polymer matrix has hard segments and soft segments wherein multi-lobed polymeric elements formed from pre-expanded polymeric microspheres are present in the polymer matrix and wherein the multi-lobed polymeric elements are deflated residues of the pre-expanded polymeric microspheres and wherein the polishing layer further comprises pores formed by a portion of the pre-expanded polymeric microspheres that retain a shape that is substantially spherical or ellipsoid and 0.1 to 20 percent of the pre-expanded polymeric microspheres form the multi-lobed polymeric elements.

2. The polishing pad of claim 1 wherein the multi-lobed polymeric elements comprise three or more lobes.

3. The polishing pad of claim 1 wherein at least a portion of the deflated residues of the pre-expanded polymeric microspheres comprise a residual irregular void space.

4. The polishing pad of claim 1 wherein at least a portion of the lobes of the multi-lobed polymeric elements comprise plate-like protrusions that project from a central region.

5. The polishing pad of claim 1 wherein the pre-expanded polymeric microspheres specific gravity of 0.06 to 0.096.

6. The polishing pad of claim 1 wherein the pre-expanded polymeric microspheres comprise a polymeric shell having a chlorine content less than 0.1 wt % based on total weight of the polymeric shell around a fluid filled core, where the fluid comprises a gas.

7. The polishing pad of claim 1 wherein the deflated residues of the pre-expanded polymeric microspheres do not include holes or tears when examined under scanning electron microscope at 50× magnification.

8. A method of making the polishing pad of claim 1 comprising
preparing a pre-blend of the isocyanate terminated prepolymer and the pre-expanded fluid filled polymeric microspheres in a stirred tank,
pumping a portion of the pre-blend from a bottom of the stirred tank through a conduit and recycling to a top region of the stirred tank,
mixing a portion of the pre-blend with the curative to form a mixture,
casting the mixture in a mold, and
curing the mixture in the mold.

9. A method of polishing comprising providing a substrate comprising a metal, a metal oxide, or both, and polishing the substrate using the polishing pad of claim 1.

* * * * *